(12) United States Patent
Ziglioli et al.

(10) Patent No.: US 7,421,904 B2
(45) Date of Patent: Sep. 9, 2008

(54) ASSEMBLY OF AN INTEGRATED DEVICE ENABLING A FACILITATED FLUIDIC CONNECTION TO REGIONS OF THE DEVICE

(75) Inventors: Federico Giovanni Ziglioli, Gessate (IT); Chantal Combi, Oggiono (IT); Lorenzo Baldo, Bareggio (IT); Caterina Riva, Cusago (IT); Mark Andrew Shaw, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/768,090

(22) Filed: Jun. 25, 2007

(65) Prior Publication Data

US 2008/0011090 A1 Jan. 17, 2008

(30) Foreign Application Priority Data

Jun. 23, 2006 (EP) .................................. 06425430

(51) Int. Cl.
*B01L 3/00* (2006.01)
(52) U.S. Cl. .......................................... 73/756; 422/58
(58) Field of Classification Search ................... 73/756; 422/58
See application file for complete search history.

(56) References Cited

U.S. PATENT DOCUMENTS

| | | | |
|---|---|---|---|
| 4,790,192 A | 12/1988 | Knecht et al. | |
| 4,879,903 A | 11/1989 | Ramsey et al. | |
| 4,993,143 A | 2/1991 | Sidner et al. | |
| 5,029,479 A | 7/1991 | Bryan | |
| 5,125,275 A | 6/1992 | Wilda et al. | |
| 5,133,215 A | 7/1992 | Lane, III et al. | |
| 5,763,787 A | 6/1998 | Gravel et al. | |
| 6,209,398 B1 | 4/2001 | Fowler, Jr. et al. | |
| 7,223,363 B2 * | 5/2007 | McNeely et al. | 422/58 |
| 2004/0037739 A1 * | 2/2004 | McNeely et al. | 422/58 |
| 2004/0258885 A1 | 12/2004 | Kreutter et al. | |

(Continued)

FOREIGN PATENT DOCUMENTS

EP      1176410 A1     1/2002

(Continued)

OTHER PUBLICATIONS

Frank, R., "Mounting Techniques, Lead Forming, and Testing of the MPX Series Pressure Sensors," Freescale Semiconductor, Inc., 2005, pp. 1-8.

*Primary Examiner*—Andre J Allen
(74) *Attorney, Agent, or Firm*—Lisa K. Jorgenson; Robert Iannucci; Seed IP Law Group PLLC

(57) ABSTRACT

Described herein is an assembly of an integrated device and of a cap coupled to the integrated device; the integrated device is provided with at least a first and a second region to be fluidically accessed from outside, and the cap has an outer portion provided with at least a first and a second inlet port in fluid communication with the first and second regions. In particular, the first and second regions are arranged on a first outer face, or on respective adjacent outer faces, of the integrated device, and an interface structure is set between the integrated device and the outer portion of the cap, and is provided with a channel arrangement for routing the first and second regions towards the first and second inlets.

31 Claims, 4 Drawing Sheets

U.S. PATENT DOCUMENTS

| | | |
|---|---|---|
| 2005/0072946 A1 | 4/2005 | Studer et al. |
| 2006/0022334 A1 | 2/2006 | Myers et al. |
| 2006/0260408 A1 | 11/2006 | Villa et al. |

FOREIGN PATENT DOCUMENTS

| | | |
|---|---|---|
| EP | 1420458 A2 | 5/2004 |
| EP | 1775259 A1 | 4/2007 |
| GB | 2091883 A | 8/1982 |
| WO | 88/01049 | 2/1988 |
| WO | 93/11414 | 6/1993 |

\* cited by examiner

ASSEMBLY OF AN INTEGRATED DEVICE ENABLING A FACILITATED FLUIDIC CONNECTION TO REGIONS OF THE DEVICE

BACKGROUND

1. Field

The present invention relates to an assembly of an integrated device, which enables a facilitated fluidic connection from outside to regions of the device. In particular, the following description will make explicit reference, without this implying any loss in generality, to a pressure-sensor device of a differential type.

2. Description of the Related Art

As is known, in the field of electronics, the use of silicon-microprocessing techniques for making microelectromechanical structures (so-called MEMS) is increasing.

For example, known to the art are pressure sensors, operation of which is based upon detection of a deformation of a membrane suspended over a cavity, microphones, and gas sensors, all of a MEMS type.

Also known are microelectromechanical structures providing complete analysis systems in a chip made of semiconductor material (the so-called LOC—Lab On Chip). These structures comprise in general one or more of the following elements: electrodes; reservoirs for exchange solutions or for waste solutions, or for reagents or other fluids; reaction chambers; channels for separation or conveyance of fluids; and optical interfaces.

Since the dimensions of MEMS devices are particularly small, for example less than 1 mm×1 mm×0.5 mm (length× width×thickness), traditional packaging techniques, and in particular molded or pre-molded packages of a traditional type, do not prove advantageous. Optimized packaging techniques for MEMS devices have consequently been developed, amongst which the so-called "wafer-level packaging" technique, which envisages formation of a protection layer directly on a layer of semiconductor material housing integrated devices.

For example, in the patent application EP 05425719.1 filed on Oct. 14, 2005 in the name of the present applicant, a package for an integrated device made using MEMS technology is described.

In detail (FIG. 1), an integrated device 1 (in particular a differential pressure sensor) comprises a device substrate 2 having a top surface 2a; within the device substrate 2, in particular at two distinct surface portions thereof, a first pressure sensor 3 and a second pressure sensor 4 are formed. Each pressure sensor 3, 4 comprises a buried cavity 5, which is separated from the top surface 2a by a membrane 6; the membrane 6 is flexible, deformable, and suspended over the buried cavity 5. The buried cavity 5 is isolated from, and entirely contained within, the device substrate 2. Transducer elements 7, for example piezoresistors, are arranged inside the membrane 6, detect deformations of the membrane 6 (due to an applied pressure), and generate corresponding electrical signals.

The integrated device 1 further comprises a capping substrate 10, made of semiconductor material (for example silicon), glass, or other ceramic or polymeric material, which is mechanically coupled to the device substrate 2, above the front surface 2a, so as to cover and protect the first and second pressure sensors. The capping substrate 10 is coupled to the device substrate 2 via a bonding process, which exploits a sealing region 13, set in contact and on top of the front surface 2a to ensure bonding. The sealing region 13 surrounds, without being superimposed thereon, the respective membrane 6 of the first and second pressure sensors 3, 4. In addition, the capping substrate 10 has a first sensor cavity 14 and a second sensor cavity 15, separate from one another in a fluid-tight manner and arranged above, and in communication with, a respective membrane 6 of the pressure sensors, and a first entry region 16 and a second entry region 17 for accessing the first and second sensor cavities 14, 15 from outside the capping substrate 10.

Input/output electrical connections are provided for electrical connection of the pressure sensors 3, 4 with the outside, for example in the form of connection pads 18, which are carried by a portion of the front surface 2a set outside the sealing region 13 and the capping substrate 10, and which can be contacted using the wire-bonding technique.

The integrated device 1 further comprises a package 20, of a land-grid array (LGA) type (as shown in FIG. 1), or ball-grid array (BGA) type (in a way not illustrated), which englobes the assembly constituted by the device substrate and the capping substrate. In detail (see also FIG. 2), the device substrate 2 is joined, via an adhesion layer 21, to a base body 22, for example, a multilayer organic substrate, defining the base of the package 20. A coating 24 of plastic material, for example comprising resin, obtained via a mould of appropriate shape and size, covers the integrated device laterally, but not the outer surface of the capping substrate 10 (i.e., the surface not in contact with the device substrate 2), which forms part of a first outer face 20a of the package 20. In this way, the first and second entry regions 16, 17 remain free and exposed from the outside of the package 20 (as is clearly evident from FIG. 2) so as to enable inlet of fluids, a difference of pressure of which is to be determined, inside the integrated device. Through connections 25, made through the base body 22, connect the connection pads 18 to external contact pads 26 of metal material, carried by an outer surface of the base body 22, defining a second outer face 20b of the package (as is known for the LGA technique). The dimensions of the package 20 are in this way particularly small, for example in the region of 5 mm×5 mm×1 mm.

As shown in FIG. 3, the package 20 can further house an ASIC (Application-Specific Integrated Circuit) die 27 made of semiconductor material, integrating an ASIC and electrically coupled to the integrated device 1. The ASIC die 27 is joined to the base body 22 via a respective adhesion layer 21, laterally to the integrated device 1, and is surrounded by the coating 24. Electrical connections (e.g., electrical wires) connect (for example, via the wire-bonding technique) the ASIC die 27 to the integrated device 1 and to the through connections 25 for connection to the outside.

Differential-pressure-sensor devices are also known, as described for example in US Patent Publication No. 2006/0260408 filed on May 4, 2006 and assigned to the same assignee of the present application, which are configured so as to provide a lateral access to the substrate in which the pressure sensor is integrated. In particular, a connection channel, buried inside the device substrate, extends laterally with respect to the buried cavity 5 and is in fluidic connection with an internal surface of the membrane 6. The device substrate is processed in an appropriate way (for example, with back-end techniques) so as to enable lateral access to the connection channel, and hence access to the buried cavity. The membrane 6 is thus deformed as a function of a difference in the pressures that act on its external and internal surfaces.

In the above case (FIG. 4), the integrated device 1 comprises just one pressure sensor 3 integrated in the device substrate 2, so that the capping substrate 12 has only a first entry region 16 for access to the corresponding membrane 6.

A second entry region 17 is provided at the side of the package 20 in an outer side face 20c thereof adjacent to (i.e., having a side in common with) the first outer face 20a so as to traverse the coating 24 and reach the buried connection channel.

The microelectromechanical devices and structures described all require an interaction with the outside world, for example, for inlet of fluids, the pressure of which is to be determined (as in the case of pressure sensors), or else which have to undergo analysis or desired treatments (as in the case of LOCs). For this reason, fluid-introduction elements, for example ducts of appropriate shape and size, or else other introduction means (for example syringes, in the case of LOCs), must be coupled to the integrated devices so as to enable interfacing with entry regions thereof (for example, the aforesaid first and second entry regions 16, 17, set in fluid communication with the deformable membranes of the pressure sensors).

A problem that may arise is due to the fact that the extremely small dimensions of the microelectromechanical devices, and the consequent minimal spacings between the entry regions, can render coupling with the aforesaid fluid-introduction elements extremely difficult. Usually, in fact, the fluid-introduction elements are manufactured using standard technologies (for example, via plastic fabrication processes), and a considerable difference in dimensions exists, that can even be greater by one order of magnitude than the corresponding microelectromechanical structures. For example, the first and second entry regions 16, 17 visible in FIGS. 2 and 4 are set apart from one another by a first distance of separation d1 of 1-1.5 mm, whilst the fluid-introduction elements available and generally used comprise plastic tubes having a cross section of, for example, 3 mm. The problem highlighted is clearly all the more felt the closer the entry regions of the integrated devices are to one another and it is aggravated by the fact that the same regions are arranged on the same surface of the integrated devices (as in the case of FIG. 2) or even on adjacent surfaces (as in the case of FIG. 4). More in general, the aforesaid entry regions are often arranged in such a way as to render far from convenient, or in any case not optimized, the interaction between the outside world and the fluid-introduction elements.

BRIEF SUMMARY

One embodiment of the present invention provides an assembly of an integrated device that will enable the aforesaid problems to be overcome, and in particular that will enable a facilitated interfacing from outside with regions of the integrated device.

According to embodiments of the present invention, an assembly of an integrated device and a corresponding cap are consequently provided, as described in the detailed description.

BRIEF DESCRIPTION OF THE SEVERAL VIEWS OF THE DRAWINGS

For a better understanding of the present invention, preferred embodiments thereof are now described, purely by way of non-limiting example and with reference to the attached plate of drawings, wherein.

DETAILED DESCRIPTION

As will be clarified hereinafter, one embodiment of the present invention envisages an interface structure arranged between an integrated device, provided with one or more entry regions for access towards internal regions of the device to which a fluidic access is to be guaranteed, and an outer portion of a cap coupled to the integrated device, carrying corresponding inlets from outside set in fluid communication with respective entry regions. The interface structure has the function of providing an appropriate routing of the entry regions towards the inlets to enable a suitable arrangement of the inlets according to an easy interaction from outside with the integrated device. For example, the inlets can be arranged in such a manner as to be set apart of a distance of separation compatible with an interfacing with fluid-introduction elements made using traditional manufacturing techniques. In particular, the distance of separation between the inlets will be in this case greater than a distance of separation between corresponding entry regions of the integrated device.

In detail, according to a first embodiment of the present invention, the aforesaid interface structure is formed in an internal portion (which is set in contact with the integrated device) of the cap coupled to the device.

Figure 1:
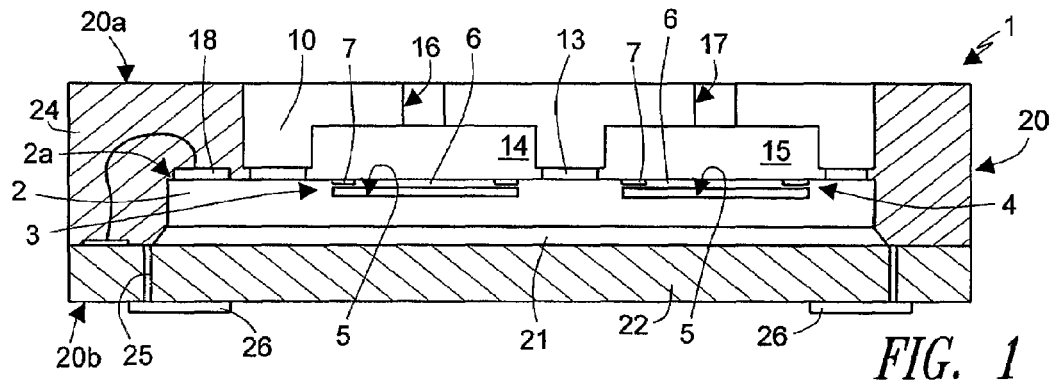
FIG. 1 shows a cross section of an LGA package of a differential-pressure-sensor device of a known type.
Figure 2:
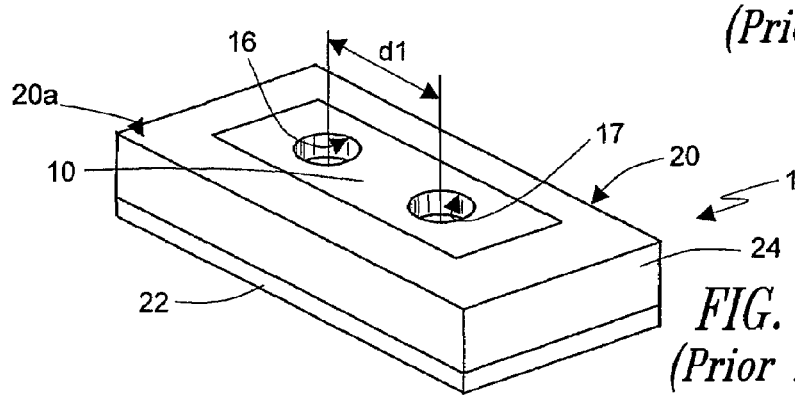
FIG. 2 is a top perspective view of the package of FIG. 1.
Figure 3:
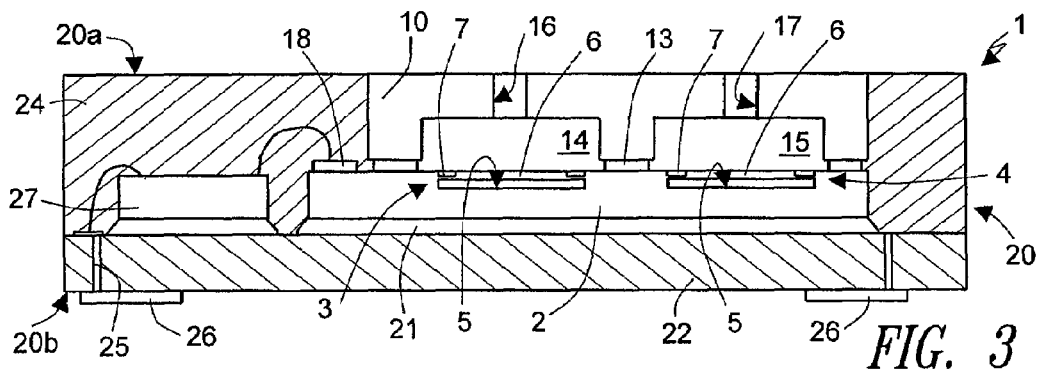
FIG. 3 shows a cross section of a variant of the LGA package of FIG. 1.
Figure 4:
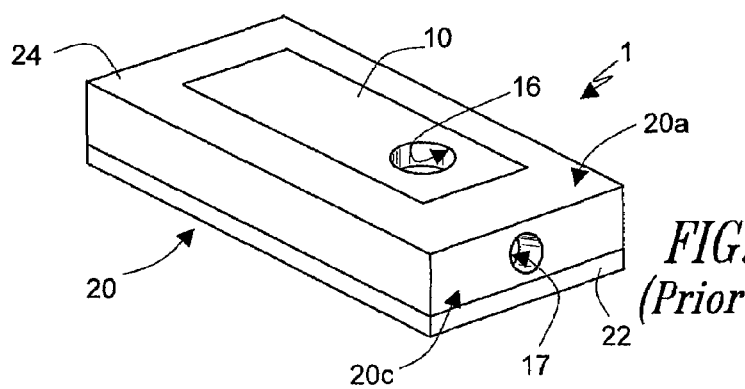
FIG. 4 is a top perspective view of a further package of a known type for a differential-pressure-sensor device.
Figure 5:
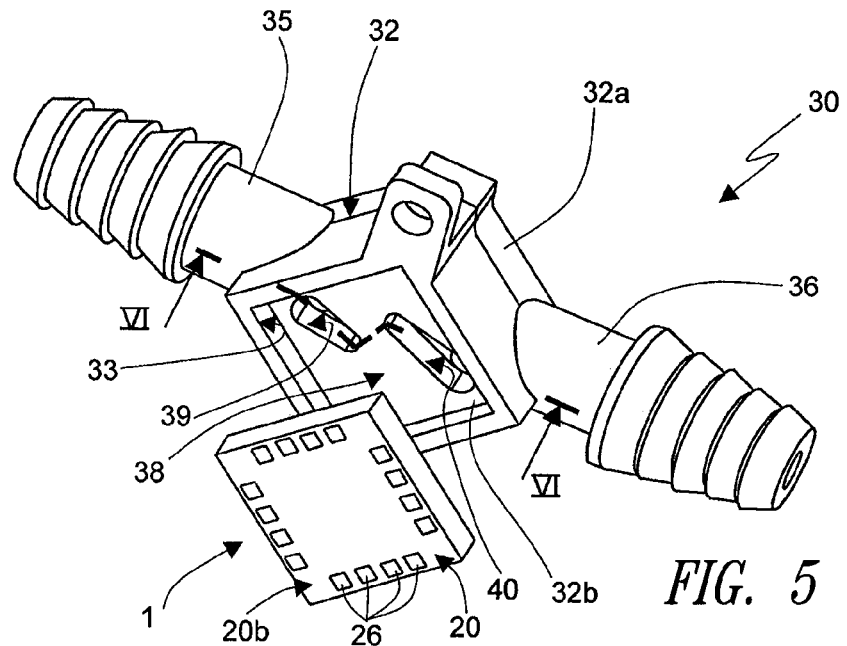
FIG. 5 is an exploded bottom perspective view of an assembly of an integrated device according to a first embodiment of the present invention.
Figure 6:
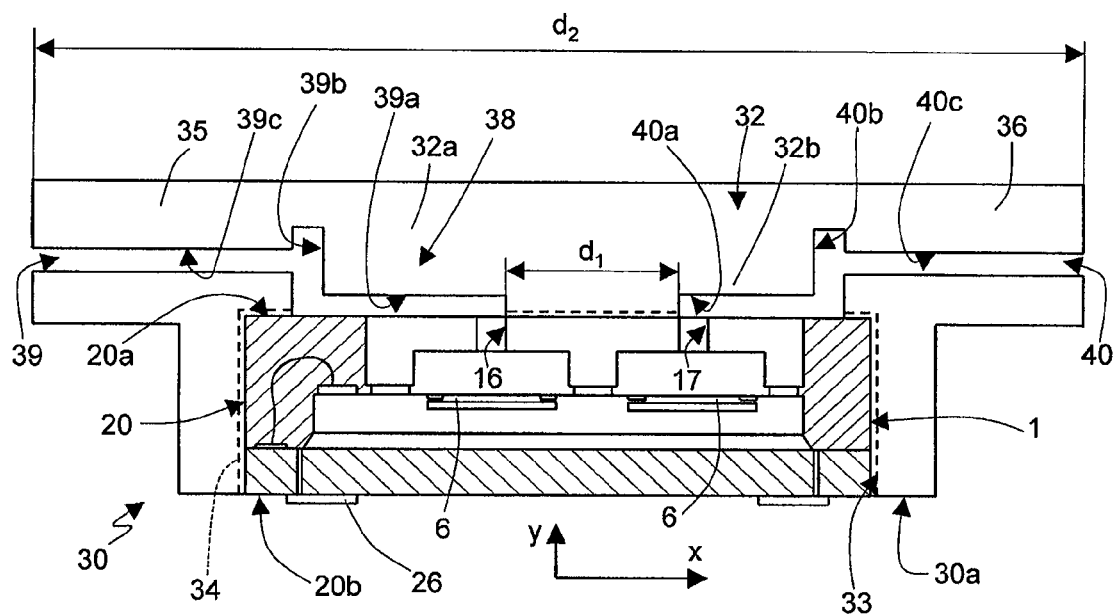
FIG. 6 shows a schematic cross section of the assembly of FIG. 5, taken along the line of section VI-VI.

FIGS. 5 and 6 show an assembly 30 of an integrated device 1, in particular a differential-pressure-sensor device encased in a package 20 of an LGA type (the package and the integrated device being substantially equivalent to those illustrated in FIGS. 1-4, so that parts that are similar are designated by the same reference numbers), and of a cap 32 designed to be coupled to the integrated device. In particular, the package 20 has a first entry region 16 and a second entry region 17 for access towards internal regions of the device (for example, they are set in fluid communication with respective membranes 6 of the integrated device), which are set apart by a first distance of separation d1, for example smaller than 1.5 mm.

In greater detail, the cap 32, made of standard materials such as thermoplastic or thermosetting resins or metals, has at its centre a seat 33, which is open outwards and is designed to receive the package 20, thus having a shape substantially corresponding to that of the package. In particular, the package 20 contacts the seat 33 with its first outer face 20a, whilst the second outer face 20b remains free and defines part of an outer surface 30a of the assembly 30. In this way, the external contact pads 26 carried by the second outer face 20b are used for contacting the integrated device 1 and can be connected to a support, for example, a printed circuit (not illustrated), using traditional techniques. The cap 32, once it is in the seat, laterally surrounds and overlies the package 20. Conveniently, a gasket 34 (shown schematically in FIG. 6) is set between the package 20 and the cap 32 so as to prevent any leakage of fluid. The gasket 34 can be made of adhesive material (polymer, silicone gel, or elastomer) so as to further provide the function of joining the package 20 to the cap 32. Two fixing slots are moreover envisaged, carried laterally by the cap 32, to enable fixing thereof to the support by means of appropriate fixing elements, for example screws or rivets. In particular, the torque for fixing to the support causes adhesion of the gasket, and corresponding fluid-tight seal between the integrated device 1 and the cap 32.

The cap 32 further comprises an outer portion 32a defining a first inlet port 35 and a second inlet port 36, integral to the cap 32, and designed, in use, to be set in fluid communication with a first environment and a second environment, containing a first fluid and a second fluid, respectively, set at a first and a second pressure. Conveniently, the first and second inlet ports 35, 36 have a threaded end portion at a distal end with respect to the seat 33 so as to enable a releasable coupling with a respective tube for communication with the first environment or the second environment (not illustrated).

According to an embodiment of the present invention, an interface structure 38, designed to route the first and second inlet ports 35, 36 respectively towards the first and second entry regions 16, 17 of the integrated device 1, is made in an internal portion 32b of the cap 32 set in contact with the integrated device.

In greater detail, the internal portion 32b of the cap 32 is monolithic and overlies the seat 33 and, in use, the first outer face 20a of the package 20. The interface structure 38 comprises a first channel 39 and a second channel 40, dug as recesses in the internal portion 32b and configured to set in fluid communication the first and second inlet ports 35, 36 with the first and second entry regions 16, 17. Advantageously, the structure and the channel arrangement formed by the first and second channels 39, 40 can be configured in such a manner as to facilitate connection of the first and second inlet ports 35, 36 with the outside world, and in particular to space the ports apart avoiding any connection problem with tubes, ducts manufactured using standard technology (so to speak, "macroscopic"). The first and second inlet ports 35, 36 are, in fact, separated from one another by a second distance of separation d2, greater than the first distance of separation d1 separating the entry regions of the integrated device (for example, greater by one order of magnitude).

The first and second channels 39, 40 are formed in distinct areas of the internal portion 32b so as to be separated in a fluid-tight manner from one another and prevent any outflow and exchange of fluid (which would jeopardize differential detection of pressure).

In the embodiment shown in FIGS. 5 and 6, the channels are configured so that the first and second inlet ports 35, 36 extend horizontally in a straight line in a first direction x, laterally and on opposite sides outwards with respect to the seat 33. In detail, each channel 39, 40 comprises: a first channel portion 39a, 40a, extending horizontally in contact with the first outer face 20a of the package 20 and in communication with a respective entry region 16, 17; a second channel portion 39b, 40b extending vertically in a second direction y orthogonal to the first direction x moving away from the aforesaid first outer face 20a and in communication with the first channel portion 39a, 40a; and a third channel portion 39c, 40c, extending horizontally in the first direction x and connecting the second channel portion 39b, 40b to a respective inlet port.

FIGS. 7-10 show possible variants of the assembly 30 and in particular of the cap 32, which differ on account of a different routing by the interface structure 38 and on account of the resulting different arrangement of the first and second inlet ports 35, 36, and of the first and second channels 39, 40.

Figure 7:
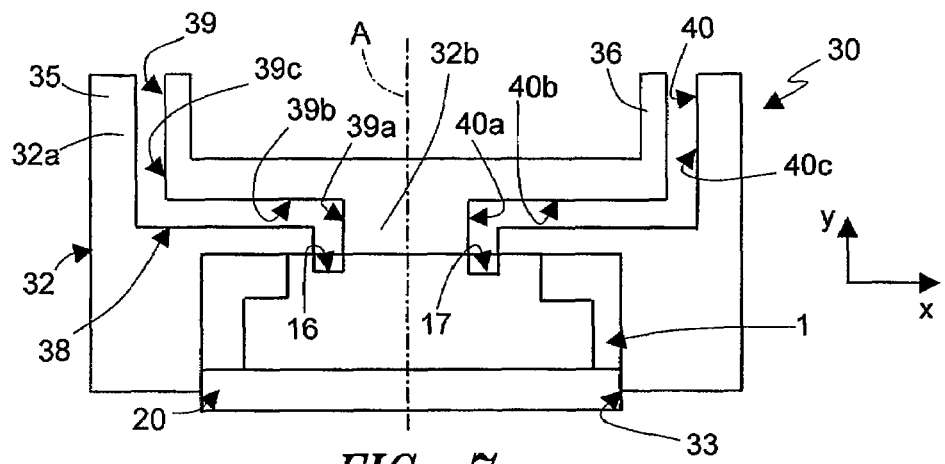
FIGS. 7-10 show simplified schematic cross sections of possible variants of the assembly of FIG. 6.

In detail, in FIG. 7 the aforesaid inlet ports 35, 36 extend vertically and parallel to one another in the second direction y. In this case, each channel 39, 40 comprises: a first channel portion 39a, 40a, extending vertically and in communication with a respective entry region 16, 17 of the integrated device 1 (here represented schematically); a second channel portion 39b, 40b, extending horizontally starting from the first channel portion 39a, 40a; and a third channel portion 39c, 40c extending once again vertically, and connecting the second channel portion 39b, 40b to a respective inlet port 35, 36.

Figure 8:
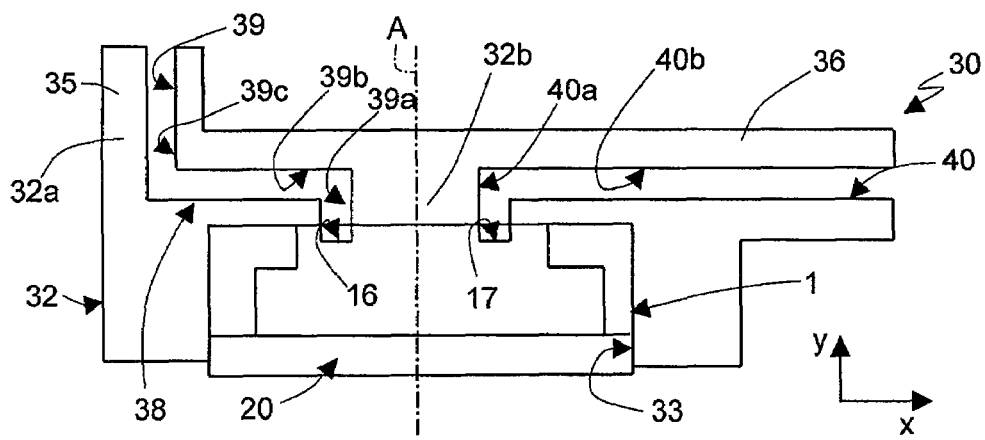
Figure 9:
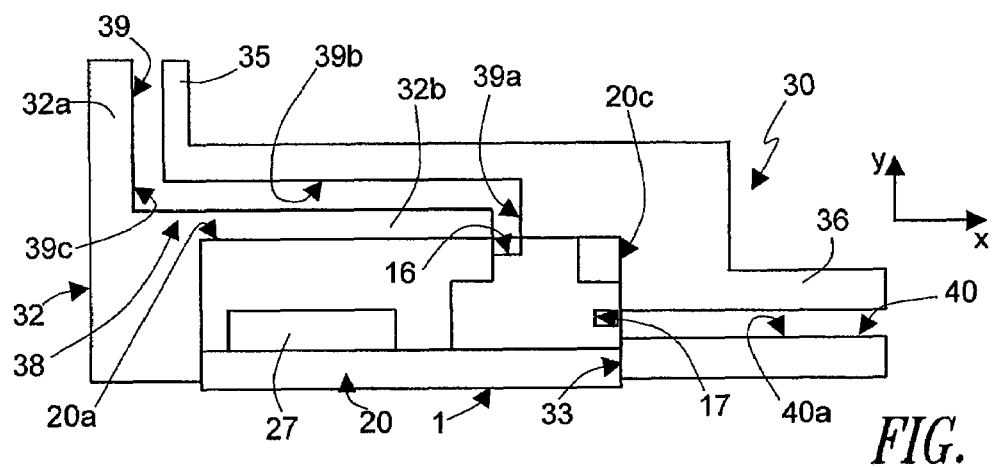

In FIG. 8, the first and second inlet ports 35, 36 are asymmetrical with respect to an imaginary median axis of the cap 32, designated by A, and in particular the first inlet port 35 extends vertically in the second direction y, whilst the second inlet port 36 extends horizontally in the first direction x. The first channel 39 comprises: a first channel portion 39a extending vertically and in communication with the first entry region 16; a second channel portion 39b extending horizontally starting from the first channel portion 39a; and a third channel portion 39c extending once again vertically, and connecting the second channel portion 39b to the first inlet port 35. The second channel 40 comprises: a respective first channel portion 40a, extending vertically and in communication with the second entry region 17; and a respective second channel portion 40b, extending horizontally and connecting the second channel portion 40b to the second inlet port 36.

The interface structure 38 can moreover be modified to enable a lateral access to the package 20, in the case where the integrated device 1 has a lateral entry region (for example, as described with reference to FIG. 4).

In detail (FIG. 9), the first inlet port 35 extends once again vertically, substantially as described previously, whilst the second inlet port 36 extends horizontally and laterally with respect to the package 20 so as to be in fluid communication with the second entry region 17 made on the outer side face 20c of the package, adjacent to its first outer face 20a. In this case, the corresponding second channel 40 comprises only a first substantially horizontal channel portion 40a, which connects the second entry region 17 to the second inlet port 36. It should be noted that the package 20 in FIG. 9, in a way similar to what is described with reference to FIG. 3, further houses an ASIC die 27.

Figure 10:
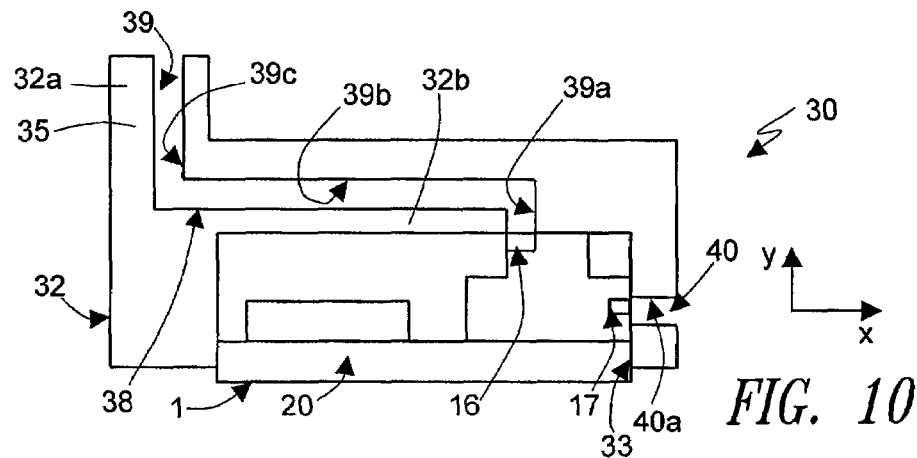

FIG. 10 shows yet a further variant of the assembly 32 in accordance with the first embodiment of the invention, once again with reference to the case of lateral access to the package 20.

In this case, the cap 32 has only one inlet port (for example, the first inlet port 35), whilst, instead of the second inlet port, a simple inlet is provided, designated once again by 36. In this case, the integrated device 1 carries out, in fact, a differential measurement of pressure with respect to the atmospheric pressure (which reaches the inside of the integrated device through the second channel 40, here comprising only a first channel portion 40a, which is substantially horizontal).

A second embodiment of the present invention envisages that the aforesaid interface structure 38 is distinct and independent with respect to the cap 32 and is set between the cap and the integrated device 1.

In particular, the interface structure 38 is formed by the superposition of a plurality of layers of an appropriate material, for example, photoresist, which can be etched and shaped easily, in such a manner as to provide, together, a three-dimensional channeling structure routing the entry regions of the integrated device towards the inlet ports 35, 36 provided in the cap 32.

Figure 11:
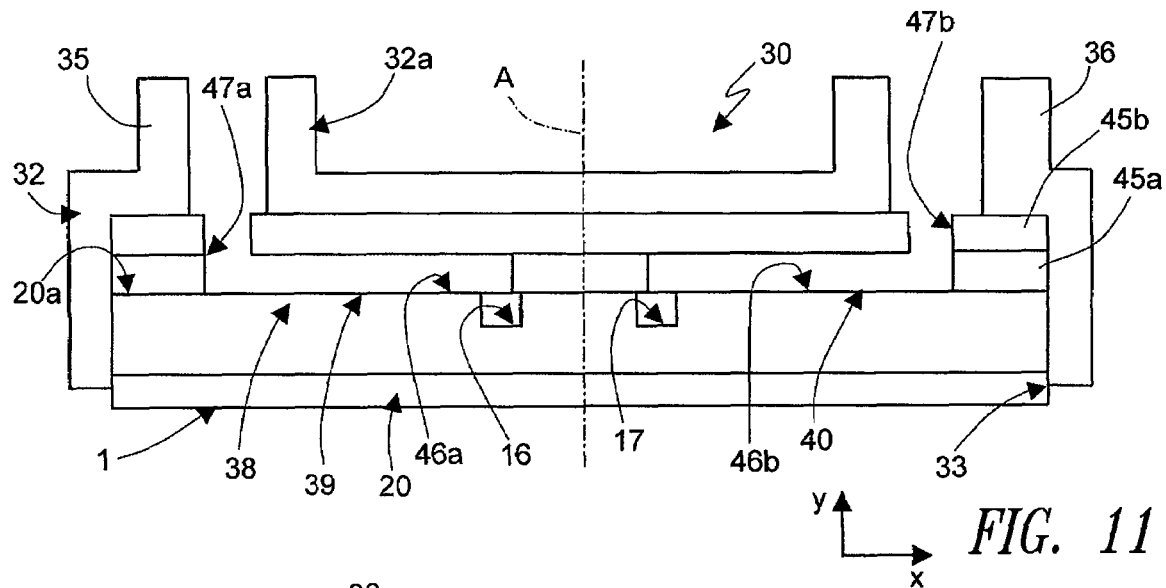
FIG. 11 shows a schematic cross section of an assembly of an integrated device in accordance with a second embodiment of the present invention.

In the example shown in FIG. 11, the interface structure 38 comprises a first photoresist layer 45a and a second photoresist layer 45b set on top of one another, which are deposited and etched (using standard photolithographic technologies) above the integrated device 1, in particular on the first outer face 20a of the package 20.

In detail, the first photoresist layer 45a is set in contact with the first outer face 20a and is etched so as to form first openings 46a, 46b in communication with the first and second entry regions 16, 17 of the integrated device 1, and extending (see also FIG. 12) horizontally in the first direction x. The second photoresist layer 45b is set in contact with the first photoresist layer 45a, and is etched so as to form second openings 47a, 47b in communication with respective first openings 46a, 46b. The superposition of the layers of photoresist determines the formation of a channeling structure, comprising a first channel and a second channel, designated once again by 39 and 40, in communication, respectively, with the first and second entry regions 16, 17 of the integrated device and the first and second inlet ports 35, 36 defined by the cap 32. In this case, the superposition of the integrated device 1 and of the three-dimensional channeling structure formed by the layers of photoresist 45a, 45b is arranged in the seat 33 of the cap 32, with the second photoresist layer 45b in contact with the cap.

Figure 12:
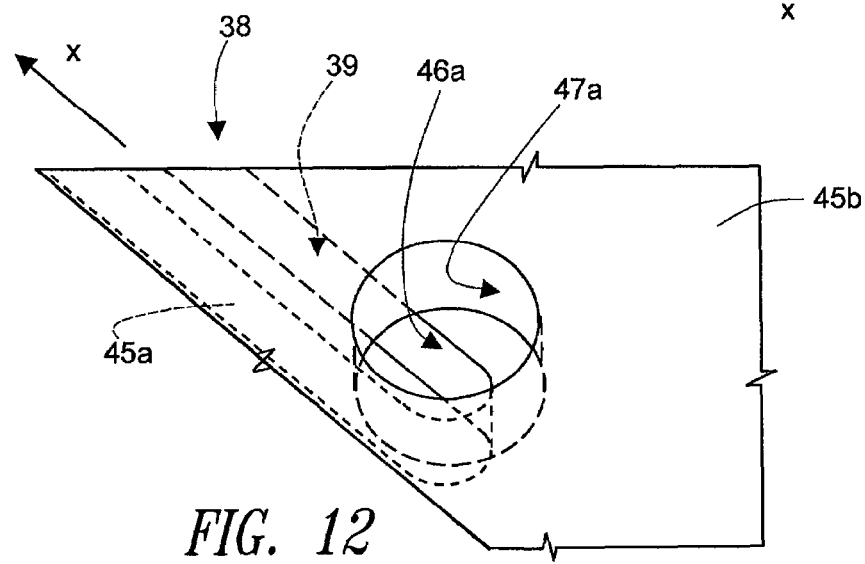
FIG. 12 shows an enlarged perspective view of a detail of the assembly of FIG. 11.

FIG. 12 shows an enlarged detail of the interface structure 38, which highlights how the superposition of the photoresist layers 45a, 45b determine the formation of a three-dimensional channel 39 for access to an entry region of the integrated device.

It is evident that an arbitrary number of layers, greater than or equal to two, can be envisaged for providing the aforesaid three-dimensional channeling structure, which can also have different thicknesses and possibly be made of different materials. In addition, the openings defined in the layers can have different transverse dimensions, as shown in the example of FIG. 12.

The assembly of an integrated device described above has numerous advantages.

In the first place, it is suited for MEMS integrated devices, in particular comprising LGA packages (or the like), which have small dimensions and require a fluidic connection with the inside through entry regions. The interface structure enables, in fact, via the routing channeling structure, a convenient arrangement of the inlet ports to the aforesaid entry regions, at the same time providing a fluidic isolation between the same regions.

The assembly is simple to handle and solid, it being substantially equivalent to a package of the "full-molded" type. Furthermore, its fabrication is compatible with production lines of a standard type.

The assembly enables a wide versatility of use, in so far as the configuration of the inlet ports and of the interface structure (and of the corresponding channeling structure) can be readily modified according to specific design requirements. One and the same cap can also be adapted to a number of integrated devices, possibly exploiting only some of the inlet ports, and closing in a sealed way the ones not used.

The second embodiment described enables simple and low-cost construction of the interface channels, using standard etching operations known to the art in the semiconductor field. In addition, it enables an extremely precise processing of the channels.

Furthermore, the assembly can be easily managed and positioned, and in particular can be advantageously used as surface-mount device (SMD), given the presence of the external contact pads 26 outside the assembly 30.

Finally, it is clear that modifications and variations can be made to what is described and illustrated herein, without thereby departing from the scope of the present invention, as defined in the annexed claims.

In particular, it must be clear that the assembly described is not to be understood as limited to a differential-pressure-sensor device, in so far as it is evident that it is advantageous in combination with any integrated device that has at least one internal portion, to which it is desired to gain fluid access from outside (for example, a gas sensor, a LOC, etc.) through an entry region. In any case, the interface structure 38 enables a routing of the aforesaid entry region towards an appropriate position of the cap in which it is convenient to provide an inlet port.

The aforesaid assembly enables optimal access to a plurality of entry regions of the integrated device, maintaining a fluid-tight isolation between the various inlet channels, and it is particularly advantageous when the entry regions are in a same face of the integrated device or in adjacent faces (and it is consequently necessary to space the corresponding inlets from one another). It is clear that the number and arrangement of the inlet ports and of the entry regions of the integrated device can differ from what illustrated.

In addition, the package 20 can be of a QFN type, a SO type, with exposed silicon, or in general of a type not provided with interface (in terms of ports and/or mechanical connections) with the outside world.

The inlet ports 35, 36 can be arranged at any other angle with respect to one another (in addition to being aligned, parallel or orthogonal as shown previously), or more in general be arranged according to any desired arrangement (for example, they may be parallel, with one coming out from the top surface of the package and the other from its side surface; or else they can be arranged to form a U parallel to the first outer face 20a of the package 20).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An assembly comprising:
    an integrated device provided with at least a first and a second region to be fluidically accessed from outside;
    a cap having an outer portion provided with at least a first and a second inlet in fluid communication with said first and second regions, respectively, wherein the cap is coupled to the integrated circuit; and
    an interface structure set between said integrated device and said outer portion of said cap and provided with a channel arrangement configured to couple said first and second regions to said first and second inlets, respectively.

2. The assembly according to claim 1, wherein said first and second regions are arranged on a first outer face, or on respective adjacent outer faces, of said integrated device.

3. The assembly according to claim 2, wherein said first and second regions comprise a respective entry to internal portions of said integrated device, and wherein said channel arrangement is configured in such a manner that said first and second inlets are set in a relative position different from that of said first and second regions.

4. The assembly according to claim 1, wherein said first and second regions are closely spaced apart from one another by a first distance of separation, and said interface structure is configured in such a manner that said first and second inlets are spaced by a second distance of separation that is greater, in particular by at least one order of magnitude, than said first distance of separation.

5. The assembly according to claim 1, wherein said interface structure comprises at least a first and a second channel which are isolated from one another in a fluid-tight manner and are respectively in fluid communication with said first and second regions and with said first and second inlets.

6. The assembly according to claim 1, wherein said cap comprises an internal portion set in contact with said integrated device, and said interface structure is formed in said internal portion of said cap, said channel arrangement comprising recesses dug in said internal portion.

7. The assembly according to claim 6, wherein said internal portion of said cap is monolithic and covers a first outer face, or respective adjacent outer faces, of said integrated device.

8. The assembly according to claim 1, wherein said interface structure comprises a plurality of interface regions arranged, so that they are set on top of one another, between said integrated device and said outer portion of said cap, a plurality of openings being defined in said interface regions, and a spatial superposition of said openings forming said channel arrangement.

9. The assembly according to claim 8, wherein said interface regions comprise a shapable material, for example photoresist.

10. The assembly according to claim 1, wherein said cap defines a seat for said integrated device, said interface structure facing said seat, and said seat being configured in such a manner that a first outer face or respective adjacent outer faces of said integrated device is/are housed in said seat, and a second outer face of said integrated device, opposite to said first outer face, is accessible from outside and forms part of an outer surface of said assembly.

11. The assembly according to claim 10, wherein said integrated device comprises electrical contacts carried by said second outer face.

12. The assembly according to claim 10, wherein said outer portion of said cap defines at least a first and a second port, which in turn define said first and second inlets and are integral with said outer portion.

13. The assembly according to claim 12, wherein said first and second inlet ports are configured in one of the following arrangements:
in line and extending in a horizontal direction, on opposite sides of said seat housing said integrated device, in a way symmetrical with respect to a median axis of said integrated device;
parallel to one another and extending in a vertical direction, substantially orthogonal to said horizontal direction, in a way symmetrical with respect to said median axis of said integrated device; and
one of the first and second inlet ports extending in said horizontal direction and the other one of the first and second inlet ports in said vertical direction, and positioned asymmetrically with respect to said median axis of said integrated device.

14. The assembly according to claim 13, wherein said interface structure comprises at least a first and a second channel which are isolated from one another in a fluid-tight manner and are in fluid communication with said first and second regions and, respectively, said first and second inlets; said first and second channels comprising a plurality of respective portions extending mutually in fluid communication, each in said horizontal direction or in said vertical direction, and connecting said first and second regions to said first and second inlet ports, respectively.

15. The assembly according to claim 1, wherein said integrated device comprises:
a device substrate made of semiconductor material, having a top face and housing at least one integrated element, provided with an active area in the proximity of said top face;
a capping substrate, mechanically coupled to said device substrate above said top face so as to cover said integrated element, in such a manner that an empty space is provided at said active area, said first region comprising an entry towards said empty space made through said capping substrate; and
a package, comprising a base body mechanically coupled to said device substrate, and a coating region, configured to coat laterally said device substrate and said capping substrate, and to leave exposed and accessible from outside a top surface of said capping substrate, defining part of a first outer face of said integrated device, and in particular said entry towards said empty space.

16. The assembly according to claim 15, wherein said package is of an LGA or BGA type, and has electrical contacts carried by a surface of said base body, not in contact with said device substrate, and defining a second outer face of said integrated device.

17. The assembly according to claim 15, wherein said active area comprises a membrane suspended over a buried cavity formed inside said device substrate, and wherein said integrated device is a differential pressure sensor.

18. The assembly according to claim 1, further comprising:
a gasket at least partially surrounding the integrated device to prevent leakage of fluid.

19. A cap for an assembly, comprising:
an outer portion provided with first and second inlets for fluid communication with first and second regions of an integrated device; and
an interface structure for contact with the integrated device, the interface structure having a channel arrangement with recesses structured to couple the first and second inlets to the first and second regions of the integrated device.

20. The cap of claim 19 wherein the first and second regions are spaced apart from one another by a first distance of separation, the interface structure configured such that the first and second inlets are spaced by a second distance of separation that is greater than the first distance of separation.

21. The cap of claim 19 wherein the interface structure comprises at least a first and a second channel which are isolated from one another in a fluid-tight manner and are respectively in fluid communication with the first and second regions and with the first and second inlets.

22. The cap of claim 19, further comprising:
a gasket at least partially surrounding the integrated device to prevent leakage of fluid.

23. A differential-pressure-sensor device, comprising:
an integrated device provided with at least a first and a second region to be fluidically accessed from outside, the integrated device including a pressure sensor;
a cap having an outer portion provided with at least a first and a second inlet in fluid communication with said first and second regions wherein the cap is coupled to the integrated circuit; and
an interface structure set between said integrated device and said outer portion of said cap and provided with a channel arrangement configured to couple said first and second regions to said first and second inlets, respectively.

24. The device of claim 23 wherein the first and second regions are arranged on a first outer face or on respective adjacent outer faces of the integrated device.

25. The device of claim 24 wherein the first and second regions comprise a respective entry to internal portions of the integrated device, and wherein the channel arrangement is configured in such a manner that the first and second inlets are set in a relative position different from that of the first and second regions.

26. The device of claim 23 wherein the interface structure comprises at least a first and a second channel which are isolated from one another in a fluid-tight manner and are respectively in fluid communication with the first and second regions and with the first and second inlets.

27. The device of claim 23, further comprising:
  a gasket at least partially surrounding the integrated device to prevent leakage of fluid.

28. A method, comprising:
  manufacturing an integrated device provided with at least a first and a second region to be fluidically accessed from outside wherein the first and second regions are arranged on a first outer face or on respective adjacent outer faces of the integrated device;
  manufacturing a cap having at least a first and a second inlet port in an outer portion of the cap, wherein the first and second inlet ports are in fluid communication with the first and second regions, respectively; and
  manufacturing a channel arrangement within an interface structure positioned between the integrated device and an outer portion of the cap, the interface structure being provided with a channel arrangement operable to couple the first and second regions to the first and second inlets, respectively.

29. The method according to claim 28, wherein manufacturing the channel arrangement comprises obtaining a desired arrangement of said first and second inlets.

30. The method according to claim 29, wherein obtaining the desired arrangement of the first and second inlets comprises arranging said first and second inlets at a distance of separation greater than a corresponding distance of separation between said first and second regions.

31. The method according to claim 28, further comprising:
  at least partially surrounding the integrated device with a gasket to prevent leakage of fluid.

* * * * *